US008589615B1

(12) United States Patent
Keren et al.

(10) Patent No.: US 8,589,615 B1
(45) Date of Patent: *Nov. 19, 2013

(54) SYSTEM AND METHOD FOR DRAM BANK ASSIGNMENT

(75) Inventors: Lior Keren, D.N. (IL); Youval Nachum, RiShon LeZion (IL); Yariv Anafi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,122

(22) Filed: Jun. 25, 2012

Related U.S. Application Data

(63) Continuation of application No. 11/586,299, filed on Oct. 25, 2006, now Pat. No. 8,209,458.

(60) Provisional application No. 60/773,554, filed on Feb. 15, 2006.

(51) Int. Cl.
*G06F 12/00* (2006.01)
*G06F 13/00* (2006.01)
*G06F 13/28* (2006.01)

(52) U.S. Cl.
USPC ............... 711/5; 711/157; 711/169; 711/105; 370/395.1

(58) Field of Classification Search
USPC .................... 711/157, 169, 5, 105; 370/395.1
See application file for complete search history.

(56) References Cited

U.S. PATENT DOCUMENTS

| | | | |
|---|---|---|---|
| 5,987,579 A * | 11/1999 | Nishtala et al. ............... | 711/169 |
| 6,160,814 A | 12/2000 | Ren et al. | |
| 6,877,076 B1 | 4/2005 | Cho et al. | |
| 6,925,086 B2 | 8/2005 | Curtis et al. | |
| 7,076,686 B2 | 7/2006 | La Fetra | |
| 7,206,857 B1 | 4/2007 | Mammen et al. | |
| 2003/0174708 A1 * | 9/2003 | Van Asten et al. ......... | 370/395.7 |
| 2005/0002220 A1 * | 1/2005 | Krause ......................... | 365/149 |
| 2005/0025140 A1 | 2/2005 | Deforche et al. | |

FOREIGN PATENT DOCUMENTS

CA 2417862 9/2003

* cited by examiner

*Primary Examiner* — Stephen Elmore
*Assistant Examiner* — Mark Giardino, Jr.

(57) ABSTRACT

A network device includes memory having memory banks, and a packet processor module configured to receive bursts of packets and segment a received packet into a plurality of sections corresponding to the memory banks. The memory is configured to store a first section of a first received packet at a first one of the memory banks, continue storing remaining sections of the first received packet in remaining ones of the memory banks, and begin storing sections of a second received packet at a second one of the memory banks. The second one of the memory banks is offset from the first one of the memory banks by at least one of a number of memory banks that is less than a total number of memory banks required to store the first received packet, and a number of banks that is randomly selected for each of the packets.

12 Claims, 7 Drawing Sheets

SYSTEM AND METHOD FOR DRAM BANK ASSIGNMENT

This application is a continuation of U.S. patent application Ser. No. 11/586,299, filed on Oct. 25, 2006, which claims the benefit of U.S. Provisional Application No. 60/773,554, filed on Feb. 15, 2006. The disclosures of the above applications are incorporated herein by reference in their entirety.

FIELD

The present disclosure relates to external memory for network devices and, more particularly, to an external reduced latency dynamic random access memory (RL-DRAM) storing network data.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Network devices, such as routers, switches, gateways, access points (AP), bridges, and concentrators, etc., may receive and retransmit wireline or wireless data, which may be in the form of packets. The network devices may also examine packets to determine appropriate packet destination addresses and may temporarily store the data for this purpose.

Packets include one or more header fields and a data field. Header fields may identify the packet source or destination, identify the protocol to be used to interpret the packet, and/or identify the packet position in a sequence of packets. The data field may contain any type of digital data.

Referring to FIG. 1, network devices may use external memories, such as dynamic random access memories (DRAM) to store packets. To improve external memory/network device interface, reduced latency dynamic random access memories (RL-DRAM) have been developed.

To optimize performance of memory chip design, memory cell arrays on DRAM-type chips are arranged in banks. AN RL-DRAM 10 generally includes N banks 12-1, 12-2, ..., and 12-N, where N may be set equal to 8. The multiple banks architecture allows higher memory utilization by parallelization.

Referring now to FIGS. 2 and 3, an RL-DRAM device has a row cycle time ($T_{RC}$) limitation, i.e. the minimal access-to-access time. By having a multiple banks architecture, utilization can be optimized by parallel usage of all banks. FIG. 2 illustrates parallel access for a single bank (Bank 0), which allows access every $T_{RC}$. FIG. 3, illustrates parallel access for multiple banks, Bank 0, Bank 1, ..., and Bank N, which allow N accesses in a $T_{RC}$ duration.

Referring now to FIGS. 1 and 4, a memory control module 16 of the network module 8 may send a packet to the RL-DRAM 10. Because packets may vary widely in length, a typical data packet 14 may be divided by a packet processor module 18 into a segmented packet 20 of M sections 20-1, 20-2, ..., and 20-M or predefined bursts.

Referring again to FIG. 1, data is moved in and out of the RL-DRAM 10 by writing data to the N banks 12-1, 12-2, ..., and 12-N in a "round-robin" fashion. In other words, a section of a packet is stored in the first bank 12-1 (Bank 0) and another section is stored in the second bank 12-2 (Bank 1). The section bank allocation is moved from bank to bank as illustrated by arrow 13 until it is stored in the $N^{th}$ bank 12-N (Bank N-1). Therefore, when a continuous burst of small packets (which occupy a single section) should be stored to the RL-DRAM, the RL-DRAM is continuously accessed with the same bank number, i.e. Bank 0, at the beginning of the bank. Writing operations such as the "round-robin" fashion, that alternate communication between two or more memory banks, may be referred to as interleaving. This interleaving allows optimized utilization of the memory, since other banks are used during the latency delay of an accessed bank.

SUMMARY

A network storage system comprises an address adjusting module that comprises a segmented packet receiver module that receives M sections of a segmented packet, where M is an integer greater than one. A bank identification (ID) overwriter module overwrites a bank ID of at least one of the M sections of the packet with a control bank ID that is different than the bank ID.

In another feature, the control bank ID comprises a starting bank ID. The address adjusting module randomly generates the control bank ID. The address adjusting module writes a control bank ID for each of the packet sections, and a packet processor that segments the packet.

In other features, a network device comprises the network storage system. The network device comprises at least one of a router, a client station, a switch, a gateway, an access point (AP), a bridge, and a concentrator. The address adjusting module is integrated with the packet processor module.

In other features, the network storage system further comprises memory comprising N banks each having a bank identification (ID), where N is an integer greater than one. The memory stores the one of the sections based on the control bank ID. The memory comprises a reduced latency dynamic random access memory (RL-DRAM). The address adjusting module generates the control bank ID by storing a last bank accessed and selecting a bank adjacent to the last bank accessed. A write operation to the adjacent bank is modulus by N. The address adjusting module writes to the N banks cyclically starting at the control bank ID.

The network storage system further comprises a packet processor module. Following the N banks that receive the sections of the packet based on the control bank ID, the packet processor module reassembles the packet for transmission through a network. The address adjusting module analyzes the memory as a plurality of lines, each line comprises N blocks. A length of each block corresponds to a capacity of a burst of one of the N banks.

In other features, a network storage method comprises receiving M sections of a segmented packet in a segmented packet receiver module of an address adjusting module, where M is an integer greater than one. The method also includes overwriting a bank ID of at least one of the M sections of the packet with a control bank ID that is different than the bank ID.

In another feature, the control bank ID comprises a starting bank ID. The network storage method further comprises randomly generating the control bank ID and writing a control bank ID for each of the packet sections. The network storage method further comprises segmenting the packet.

In still other features, the network storage method further comprises integrating the address adjusting module with a packet processor module. The network storage method further comprises storing the one of the sections based on the control bank ID in memory. The memory comprises N banks each having a bank ID, where N is an integer greater than one. The memory also comprises an RL-DRAM.

In another feature, the network storage method further comprises generating the control bank ID by storing a last bank accessed and selecting a bank adjacent to the last bank accessed. The network storage method further comprises writing to the adjacent bank modulus by N. The network storage method further comprises writing the M sections to the N banks cyclically starting at the control bank ID. The network storage method further comprises reassembling the packet for transmission through a network means for interacting between multiple devices following the N banks receiving the packet based on the control bank ID. The network storage method further comprises analyzing the memory as a plurality of lines, each line comprises N blocks. A length of each block corresponds to a capacity of a burst of one of the N banks.

In still other features, a network storage system comprises address adjusting means for adjusting an address. The address adjusting means comprises segmented packet receiver means for receiving M sections of a segmented packet, where M is an integer greater than one. The system also comprises ID overwriter means for overwriting a bank ID of at least one of the M sections of the packet with a control bank ID that is different than the bank ID.

In another feature, the control bank ID comprises a starting bank ID. The address adjusting means randomly generates the control bank ID. The address adjusting means writes a control bank ID for each of the packet sections. The network storage system further comprises packet processor means for segmenting the packet.

In other features, network means for interacting between multiple devices comprises the network storage system. The network means comprises at least one of routing means for routing data, client station means for controlling client data, switching means for switching between devices, gateway means for controlling links of the network means, AP means for providing access to the network means, bridge means for connecting segments of the network means, and concentrator means for combining network transmissions. The address adjusting means is integrated with the packet processor means.

In still other features, the network storage system comprises storing means for storing data comprising N bank means for storing data each having a bank ID, where N is an integer greater than one. The storing means stores one of the sections based on the control bank ID. The storing means comprises an RL-DRAM. The address adjusting means generates the control bank ID by storing last bank means accessed and selecting bank means for storing data adjacent to the last bank means accessed. A write operation to the adjacent bank means is modulus by N.

In other features, the network storage system comprises the address adjusting means writing the M sections to the N bank means cyclically starting at the control bank ID. Following the N bank means receiving the section of the packet based on the control bank ID, the packet is reassembled for transmission through a network. The address adjusting means analyzes the storing means as a plurality of lines, each line comprises N blocks. A length of each block corresponds to a capacity of a burst of one of the N bank means.

In other features, a computer program stored for use by a processor for operating a network storage system comprises receiving M sections of a segmented packet in a segmented packet receiver module of an address adjusting module. M is an integer greater than one. The computer program also includes overwriting a bank ID of at least one of the M sections of the packet with a control bank ID that is different than the bank ID.

In other features, the control bank ID comprises a starting bank ID. The computer program further comprises randomly generating the control bank ID and writing a control bank ID for each of the packet sections. The computer program further comprises segmenting the packet.

In still other features, the computer program further comprises storing one of the packet sections based on the control bank ID in memory. The memory comprises N banks each having a bank ID, where N is an integer greater than one. The memory comprises an RL-DRAM.

In other features, the computer program further comprises generating the control bank ID by storing a last bank accessed and selecting a bank adjacent to the last bank accessed. The computer program further comprises writing to the adjacent bank modulus by N. The computer program further comprises writing the M sections to the N banks cyclically starting at the control bank ID.

In other features, the computer program comprises reassembling the packet for transmission through a network. The computer program further comprises analyzing the memory as a plurality of lines, each line comprises N blocks. A length of each block corresponds to a capacity of a burst of one of the N banks.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
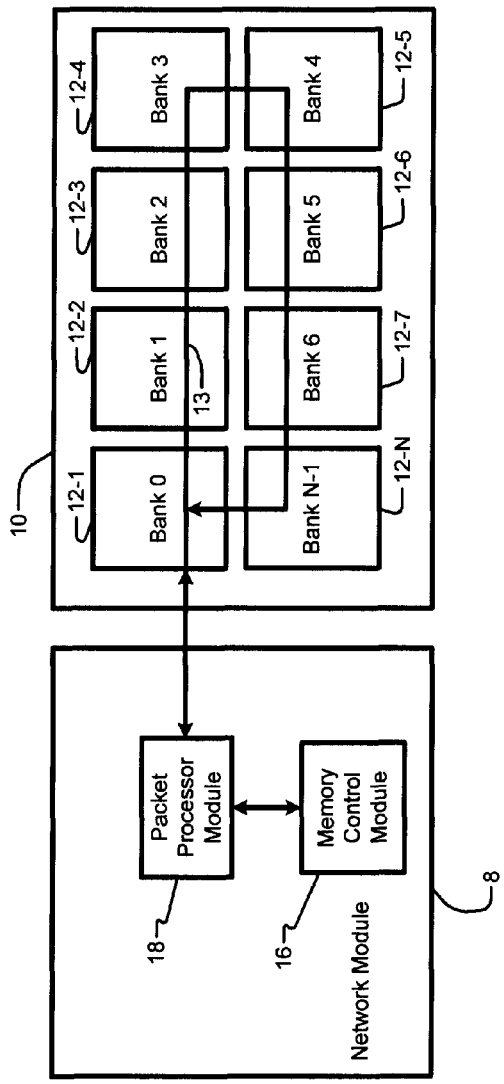
FIG. 1 is a functional bock diagram of a network storage system in accordance with the prior art.
Figure 2:
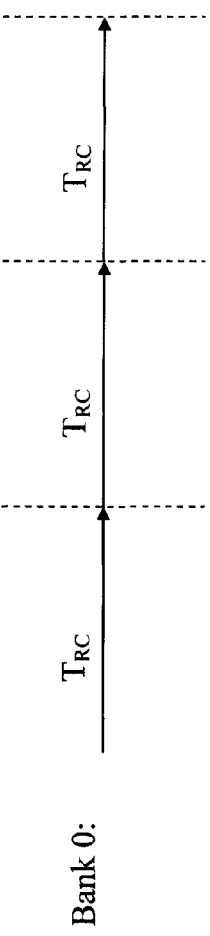
FIG. 2 is a timing diagram of parallel access for a single bank in accordance with the prior art.
Figure 3:
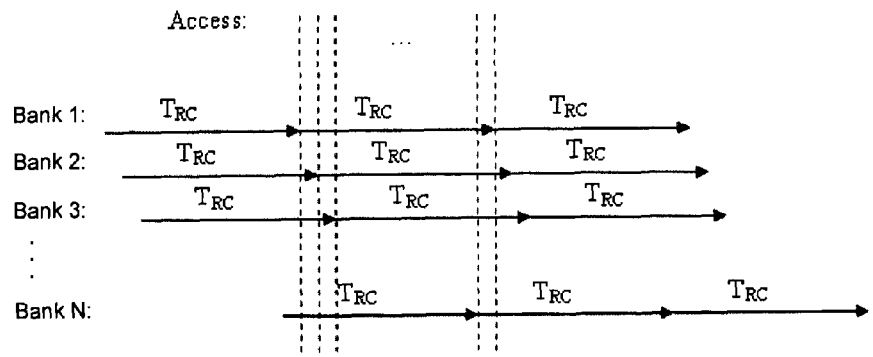
FIG. 3 is a timing diagram of parallel access for multiple banks in accordance with the prior art.
Figure 4:
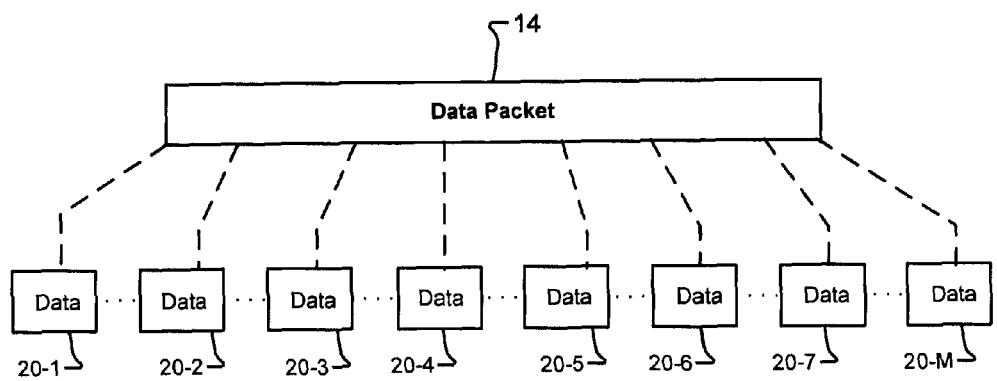
FIG. 4 illustrates a data packet in accordance with the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. It should be understood that steps within a method may be executed in different order without altering the principles of the present disclosure.

Figure 5:
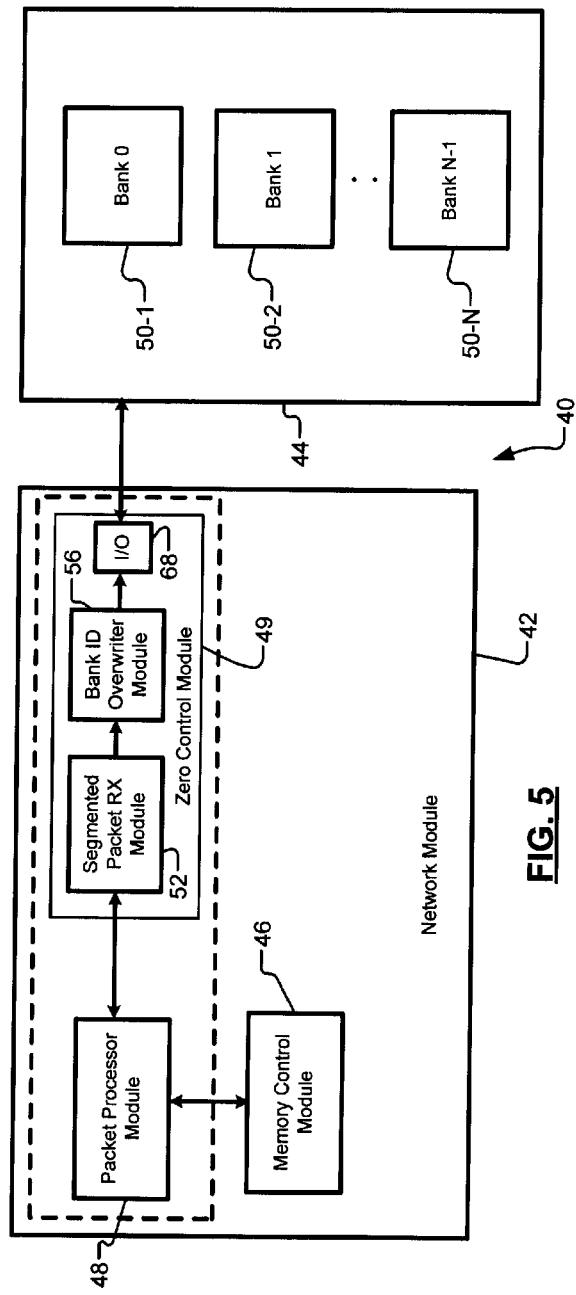
FIG. 5 is a functional bock diagram of a network storage system in accordance with the present disclosure.

Referring now to FIG. 5, a network storage system 40 is illustrated in accordance with the present disclosure. The storage system 40 includes a network module 42, which may be a router, switch, gateway, access point (AP), bridge, concentrators, or other network device, that temporarily stores network packets in an external memory 44.

A memory control module 46 within the network module 42 examines incoming packets and directs a packet to the external memory 44. Before storage in the external memory 44, a packet processor module 48 segments the packet into a plurality of sections that may correspond to the number of external memory banks. Each of the packet sections includes an address having a bank identification (ID), which indicates the bank that the section was scheduled to initially be stored in. A zero control module 49 (or address adjusting module), which may be integrated with the packet processor module 48 or the external memory 44, overwrites the address or bank ID and directs the packet sections to banks 50-1, 50-2, . . . , and 50-N of the external memory 44. The zero control module 49 may include a segmented packet receiver (RX) module 52, a bank overwriter module 56, and an input and/or output module (I/O) 58.

The external memory 44 may be a reduced latency dynamic random access memory (RL-DRAM) including N banks (i.e. N=8, therefore bank 50-1 corresponds to Bank 0, and bank 50-N corresponds to Bank 7, etc.). However, alternate memory structures with various numbers of banks may also be used.

Each of the plurality of packet sections or bursts includes address information that may designate the bank number (ID) that the packet section is to be written to. The zero control module 49 optimizes interleaving of data into the banks 50-1, 50-2, . . . , and 50-N through rewriting bank ID address information of at least one packet section with a control bank ID that designates a different first bank. Therefore, rather than only writing to Bank 0, the zero control module 49 determines a "first bank" for one or more of the plurality of bursts. The zero control module 49 may operate using either or both a "random mode" (randomly generating the first bank) or a "smart bank mode" (remembering the previous bank accessed and writing to the next bank for determining the first bank).

Figure 6:
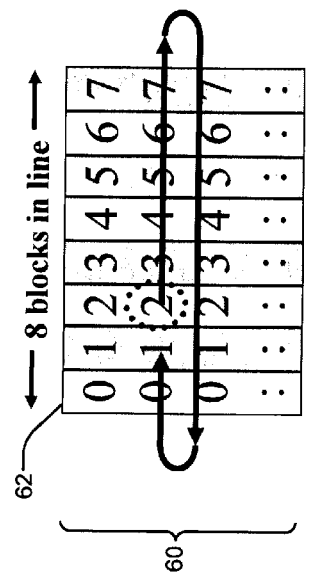
FIG. 6 illustrates a functional representation of memory bank control in accordance with the present disclosure.

Referring now to FIG. 6, the zero control module 49 treats the RL-DRAM as a plurality of lines 60. Each line includes blocks 62, such that the number of blocks in a line corresponds to the number of banks in the RL-DRAM. The size of each block corresponds to the RL-DRAM burst or storage size. When writing an RL-DRAM line, the whole line is accessed cyclically, starting at the determined first bank. Illustrated are lines of eight blocks corresponding to an RL-DRAM with eight banks. In FIG. 6, the "first bank" chosen for accessing the second line is "2". The arrow demonstrates how the blocks are subsequently accessed.

In FIG. 6, for determining "2" as the first bank for accessing the second line, the zero control module 49 may use the random mode or the smart bank mode. For the random mode, the first bank equals the second three bits of the address (Addr[5:3]) (or any other 3 bits of the address that are equal to the first 3 bits of the pre-allocated buffer, which are buff[2:0]), added to the first three bits of the address (Addr[2:0]), which equals the first three bits of the pre-allocated buffer (buff[2:0]) added to the first three bits of a line (line[0:2]) (i.e., first_bank[2:0]=Addr[5:3]+Addr[2:0]=buff[2:0]+line[2:0]). [2:0], i.e. 0, 1, 2, are the 3 bits used to point the section of the packet to a bank in the eight bank example.

The zero control module 49 "smart bank" mode includes recalling the last bank accessed regardless of the amount of memory to be written and writing to an adjacent or following bank (last bank+1). Recalling the last bank accessed is modulus by the number of banks, such that for eight banks, the cycle is modulus by eight (i.e., first_bank[2:0]=(last_bank+1)/8). "Modulus" is the remainder of division operation, e.g. 19/8=3.

Figure 7:
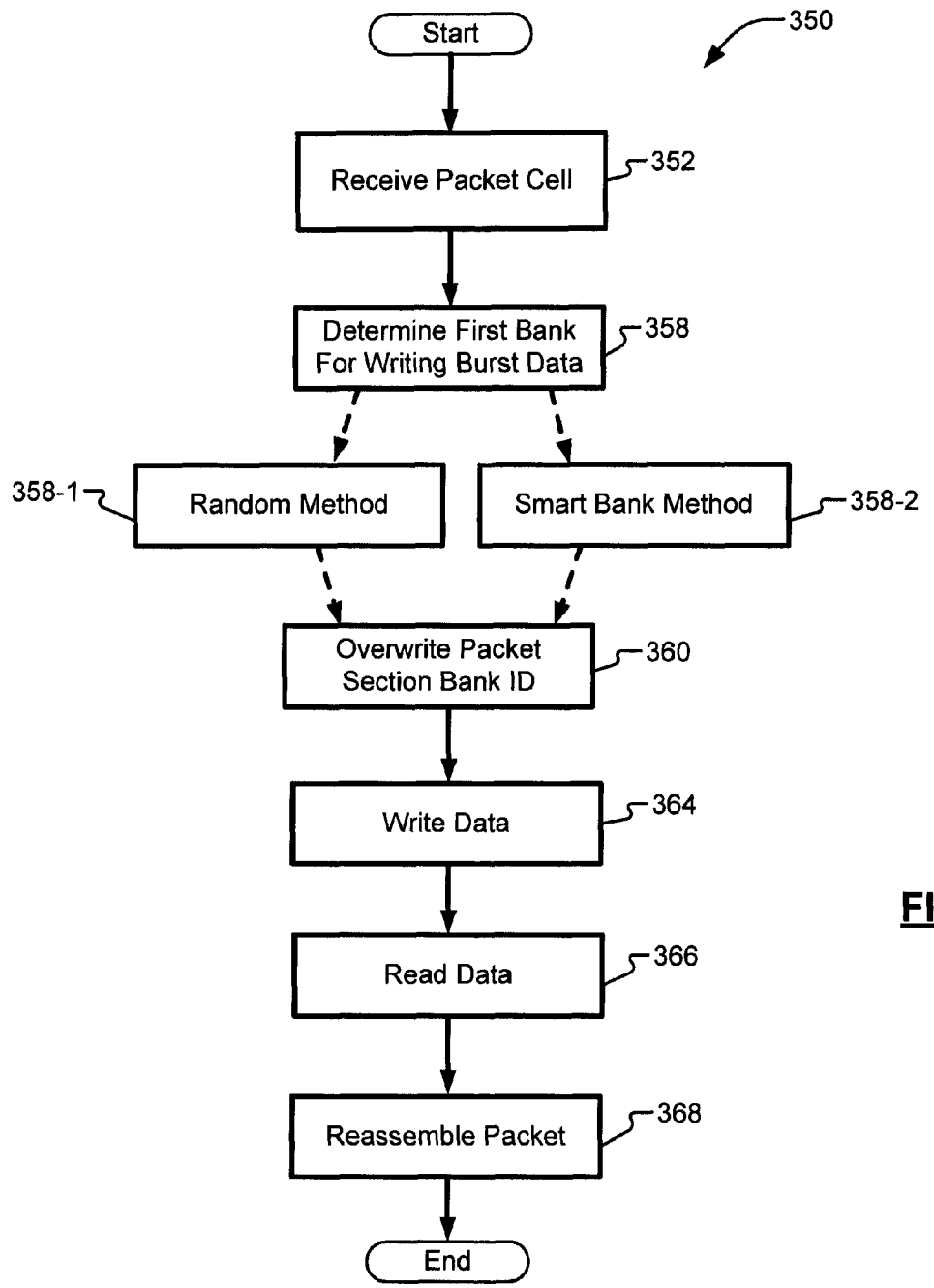
FIG. 7 illustrates a method for writing data to a memory in accordance with the present disclosure.

Referring now to FIG. 7, a method 350 for writing data to a memory is illustrated. In step 352, a packet cell is received in the network device. Each cell is a section of a packet later broken into bursts by the zero control module to fit the RL-DRAM burst size.

In step 358, the zero control module acts as an interface between the packet processor module and the external memory and determines a bank for writing a first section from the segmented packet. If the burst is the first burst of a first cell in a packet, then a "first bank" is determined. Otherwise, the bank ID may be defined by: bank_ID=(last_bank_ID+1) % N.

Step 358 may be implemented through step 358-1, which includes the random method for determining the bank ID, or 358-2, which includes the smart bank method for determining the bank ID. In step 360, the zero control module overwrites a bank ID in the first packet section with the determined first bank ID.

In step 364, packet sections are written to the banks based on the bank ID. Packet sections may be written in a round-robin fashion in the memory banks, starting at the determined first bank, in a forward or reverse manner. Further, packet sections may be written to alternating banks, such that banks are skipped at random or regular intervals, e.g. writing packet sections to every second or third bank. In step 366, following a write operation, packet sections are read from the banks. In step 368, the packet processor module reassembles the packet for transmission through the network.

Figure 8B:
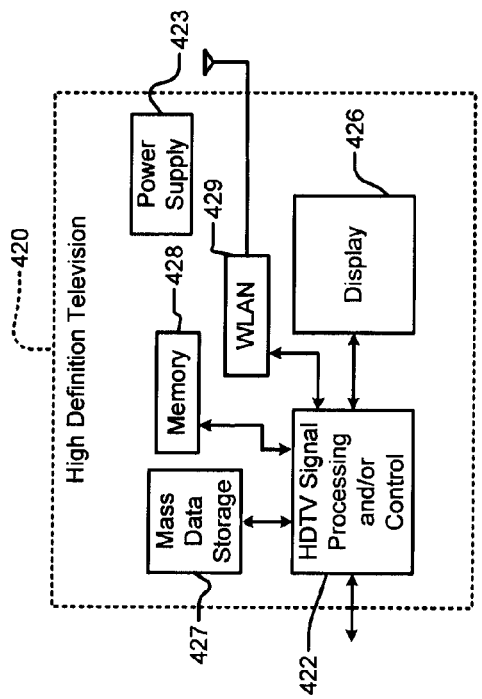
FIG. 8B is a functional block diagram of a high definition television (HDTV)
Figure 8A:
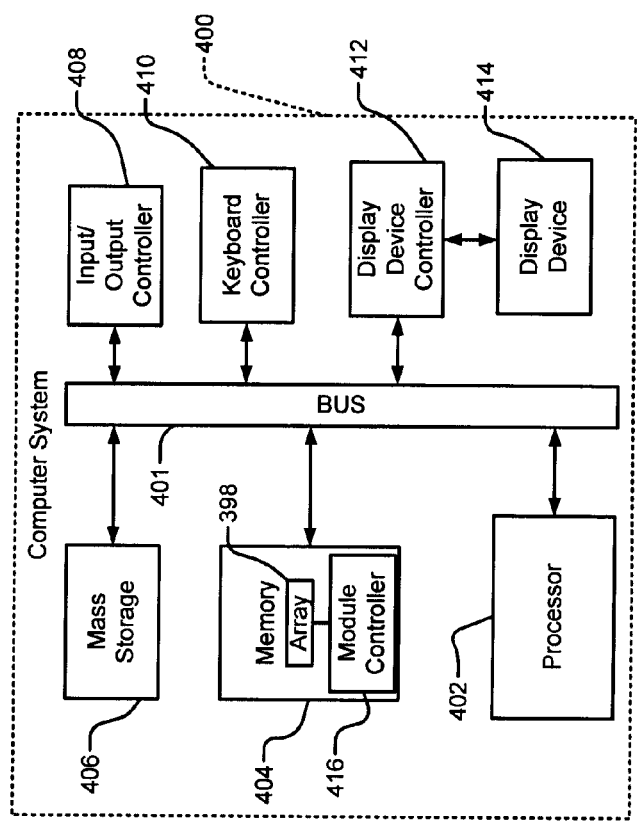
FIG. 8A is a functional block diagram of a computer system.

Referring now to FIGS. 8A-8F, various exemplary implementations of the network storage system are shown. Referring now to FIG. 8A, the network storage system can be implemented with a network storage system array 398 of a computer system 400. The computer system 400 may be a desktop, laptop, personal digital assistant, etc. that includes a processor 402 coupled through a bus 401 to memory 404 including the network storage system array 398 controlled by a module controller 416. The computer system 400 includes a mass storage device 406. A keyboard controller 410 is connected to the bus 401 for receiving commands or data entered through a keyboard, mouse, or similar input device. A display device controller 412 is also connected to the bus 401 for providing output through an appropriately connected display device 414. Also connected to the bus 401 is an input/output controller 408 for interfacing the processor 402 with other devices, such as network interface devices and the like.

The computer system 400 may communicate with a host device (not shown) including mobile computing devices such as personal digital assistants (PDA), cellular phones, media or MP3 players and the like, and/or other devices via one or more wired or wireless communication links.

Referring now to FIG. 8B, the present disclosure can be implemented in a high definition television (HDTV) 420. The network storage system may implement and/or be implemented in either or both signal processing and/or control circuits, which are generally identified in FIG. 8B at 422, a WLAN interface, mass data storage of the HDTV 420 and/or a power supply 423. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 8C:
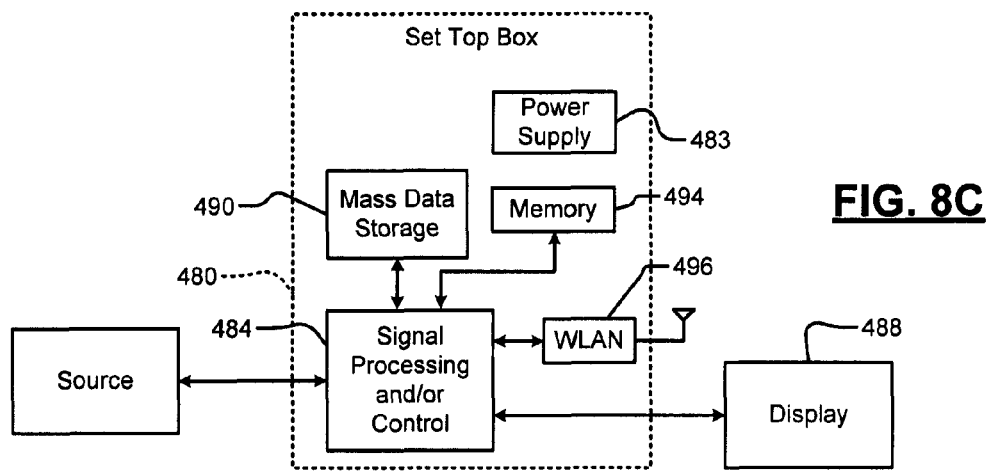
FIG. 8C is a functional block diagram of a set top box.

Referring now to FIG. 8C, the present disclosure can be implemented in a set top box 480. The network storage system may implement and/or be implemented in either or both signal processing and/or control circuits, which are generally identified in FIG. 8C at 484, a WLAN interface, mass data storage of the set top box 480 and/or a power supply 483. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices, for example, hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 8D:
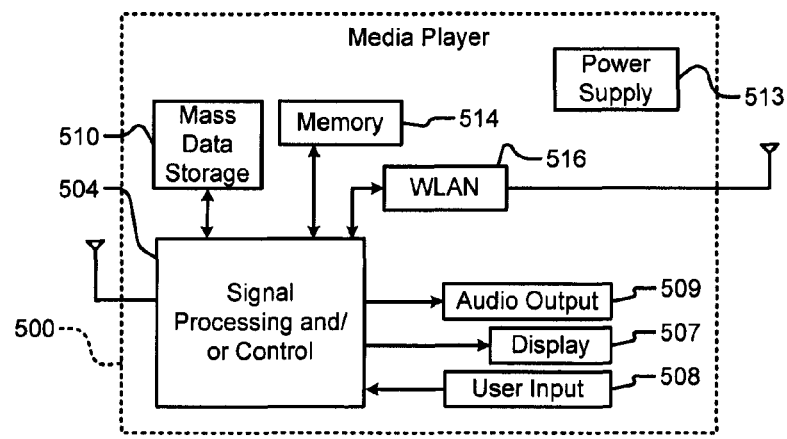
FIG. 8D is a functional block diagram of a media player.

Referring now to FIG. 8D, the present disclosure can be implemented in a media player 500. The network storage system may implement and/or be implemented in either or both signal processing and/or control circuits, which are generally identified in FIG. 8D at 504, a WLAN interface, mass data storage of the media player 500 and/or a power supply 503. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Figure 8E:
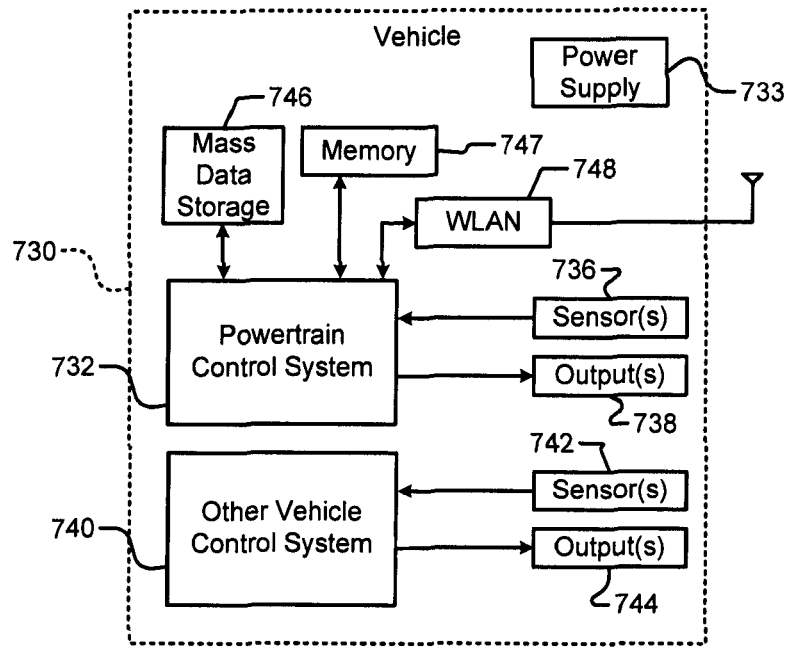
FIG. 8E is a functional block diagram of a vehicle control system.

Referring now to FIG. 8E, a network storage system may implement and/or be implemented in a vehicle control system 730, such as a powertrain control system 732. The powertrain control system 732 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The network storage system may also be implemented in other vehicle control systems 740. The control systems 740 may receive signals from input sensors 742 and/or output control signals to one or more output devices 744. In some implementations, the control systems 740 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 732 may communicate with mass data storage 746. The powertrain control system 732 may be connected to memory 747. The powertrain control system 732 also may support connections with a WLAN via a WLAN network interface 748, which may include the network storage system. The control system 740 may also include mass data storage, memory and/or a WLAN interface (all not shown).

Figure 8F:
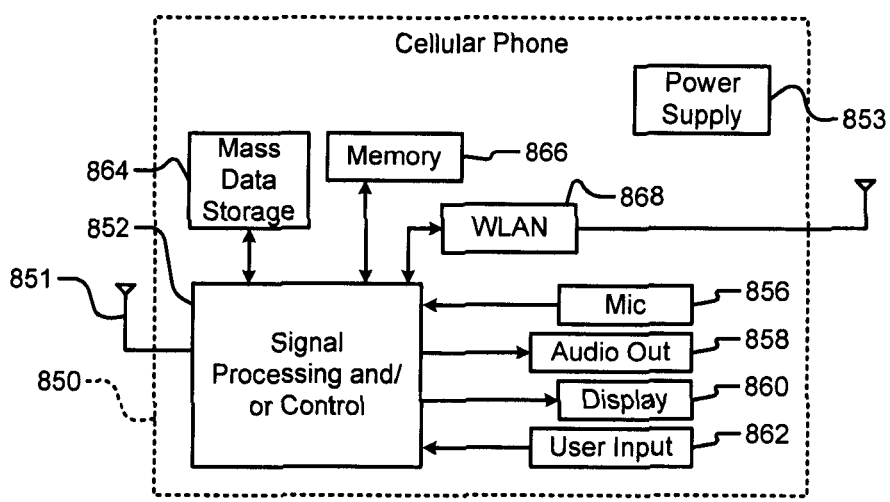
FIG. 8F is a functional block diagram of a cellular phone.

Referring now to FIG. 8F, the network storage system can be implemented in a cellular phone 850 that may include a cellular antenna 851. The cellular phone may include either or both signal processing and control circuits, which are generally identified in FIG. 8F at 852, a WLAN interface, mass data storage 864 of the cellular phone 850 and/or a power supply 853. In some implementations, the cellular phone 850 includes a microphone 856, an audio output 858 such as a speaker and/or audio output jack, a display 860 and/or an input device 862 such as a keypad, pointing device, voice actuation and/or other input device. The signal processing and/or control circuits 852 and/or other circuits (not shown) in the cellular phone 850 may process data, perform coding and/or encryption, perform calculations, format data and/or perform other cellular phone functions.

The cellular phone 850 may communicate with mass data storage 864. The cellular phone 850 also may support connections with a WLAN via a WLAN network interface 868, which may include or operate in conjunction with the network storage system.

Those skilled in the art can now appreciate from the foregoing description that the broad teachings of the disclosure can be implemented as a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A network device, comprising:
a memory having a plurality of memory banks; and
a packet processor module configured to be coupled to a network, wherein the packet processor module is further configured to
receive bursts of packets from the network, wherein the burst of packets received by the packet processor module includes a first packet and a second packet, and
segment each of the first packet and the second packet into a plurality of sections corresponding to the plurality of memory banks,
wherein the memory is configured to
store a first section of the first packet at a first memory bank of the plurality of memory banks, and continue storing remaining sections of the first packet in remaining ones of the plurality of memory banks other than the first memory bank,
begin storing the plurality of sections of the second packet at a second memory bank of the plurality of memory banks, wherein the second memory bank is different from the first one of the memory banks, and wherein the second memory bank is offset from the first memory bank by at least 1) a number of memory banks that is less than a total number of memory banks required to store the first packet, or 2) a number of memory banks that is randomly selected for each of the plurality of packets, and
continue storing remaining sections of the second packet in remaining ones of the plurality of memory banks other than the second memory bank,
wherein each of the sections of the first packet and the second packet includes a first bank identification indicating in which of the plurality of memory banks to store the section, and
wherein the network device further comprises a control module configured to, for each of the sections of the first packet and the second packet, overwrite the first bank identification with a second bank identification before the memory begins storing the section.

2. The network device of claim 1, wherein a number of the sections corresponds to a number of the memory banks.

3. The network device of claim 1, wherein when the number of memory banks is randomly selected for each of the plurality of packets, the memory is configured to select the second memory bank based on a combination of address bits in the second packet.

4. The network device of claim 1, wherein when the number of memory banks is less than the total number of memory banks required to store the first packet, the memory is configured to select the second memory bank based on a last one of the memory banks storing the remaining sections of the first packet.

5. The network device of claim 4, wherein the second memory bank is incremented by one relative to the first memory bank.

6. The network device of claim 1, wherein the network device comprises at least one of a router, a client station, a switch, a gateway, an access point (AP), a bridge, and a concentrator.

7. The network device of claim 1, wherein the memory comprises a reduced latency dynamic random access memory (RL-DRAM).

8. A method, comprising:
receiving bursts of packets;
segmenting each of the packets into a plurality of sections corresponding to a plurality of memory banks;
storing a first section of a first packet at a first one of the memory banks;
continuing to store remaining sections of the first packet in remaining ones of the memory banks;
beginning to store sections of a second packet at a second one of the memory banks that is different from the first one of the memory banks, the second one of the memory banks being offset from the first one of the memory banks by at least one of 1) a number of memory banks that is less than a total number of memory banks required to store the first packet, and 2) a number of memory banks that is randomly selected for each of the packets;
continuing to store remaining sections of the second packet in the remaining ones of the memory banks, wherein each of the sections of the first packet and the second packet includes a first bank identification indicating in which of the memory banks to store the section; and
for each of the sections of the first packet and the second packet, overwriting the first bank identification with a second bank identification before storing the section.

9. The method of claim 8, wherein a number of the sections corresponds to a number of the memory banks.

10. The method of claim 8, further comprising, when the number of memory banks is randomly selected for each of the packets, selecting the second one of the memory banks based on a combination of address bits in the second packet.

11. The method of claim 8, further comprising, when the number of memory banks is less than the total number of memory banks required to store the first packet, selecting the second one of the memory banks based on a last one of the memory banks storing the remaining sections of the first packet.

12. The method of claim 11, further comprising incrementing the second one of the memory banks by one relative to the first one of the memory banks.

* * * * *